Feb. 17, 1925.  
L. M. BOWLUS  
ICE BOX  
Filed Jan. 30, 1924  
1,526,828
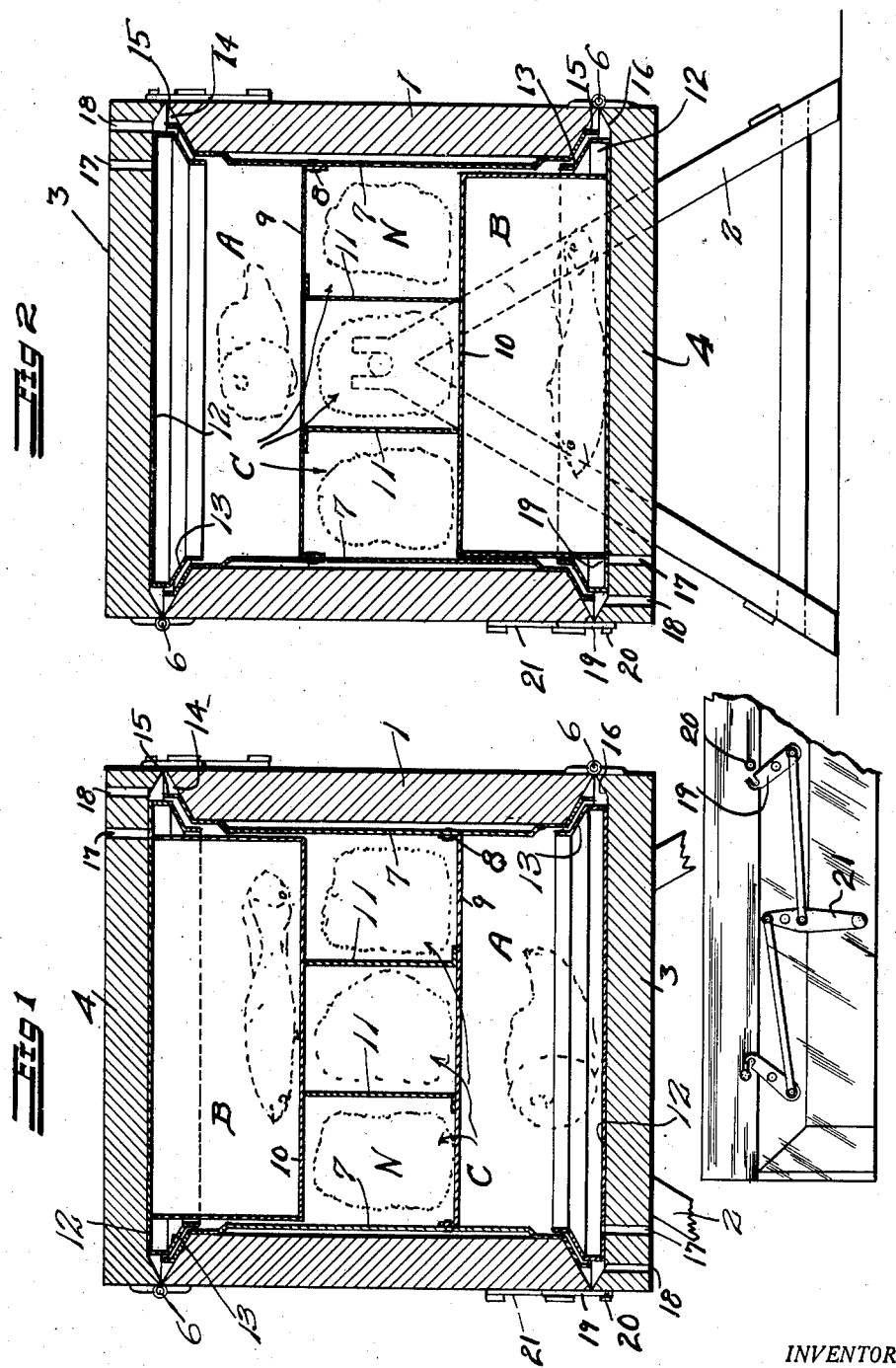
INVENTOR.  
L. M. Bowlus.  
BY  
ATTORNEYS.

Patented Feb. 17, 1925.

1,526,828

UNITED STATES PATENT OFFICE.

LAUREN M. BOWLUS, OF SAN LUIS, OBISPO, CALIFORNIA.

ICE BOX.

Application filed January 30, 1924. Serial No. 689,548.

*To all whom it may concern:*

Be it known that I, LAUREN M. BOWLUS, a citizen of the United States, residing at San Luis Obispo, in the county of San Luis Obispo and State of California, have invented new and useful Improvements in Ice Boxes, of which the following is a specification.

The present invention relates to improvements in ice boxes and resides in the provision of a reversible ice box which is constructed with separate compartments and is adapted to contain fish and other foods in such manner that the other foods do not come in contact with the fish or take on the fish odors and ready access to either compartments is provided for.

Another object of the invention is to provide an ice box of the character described which is adapted to open on opposite sides thereof, whereby access may be had to the food and fish compartments likewise provided on opposite sides of the box by reversing the box, there being an ice chamber disposed between said compartments.

Another object of the invention is to provide a novel and efficient means for collecting and draining off moisture and water so that unpleasant and insanitary conditions in and around the box may be prevented.

A further object of the invention is to provide a novel arrangement of food and ice compartments whereby the ice compartment is disposed between the food compartments and yet arranged so that ready access thereto may be had for the purpose of filling it with ice.

A further object of the invention is to provide a removable fish compartment in the form of a receptacle which provides for holding the fish in a clean and sanitary manner within the ice box and prevents the fish odors from permeating the interior of the box.

With the above mentioned and other objects in view, the invention consists in the novel construction and combination of parts hereinafter described, illustrated in the accompanying drawings, and set forth in the claims hereto appended, it being understood that various changes in the form, proportion, size and minor details of construction within the scope of the claims may be resorted to without departing from the spirit or sacrificing any of the advantages of the invention.

Referring to the drawings:

Fig. 1 represents a vertical sectional view of an ice box constructed in accordance with my invention.

Fig. 2 is a similar view with the box reversed.

Fig. 3 is a fragmentary front elevation showing the lid fastening means.

In the embodiment of the invention shown in the accompanying drawing, 1 designates a substantially square receptacle, pivotally mounted at opposite ends of a stand 2 whereby the box may be reversed to bring various sides thereof into uppermost position. The walls of the box may be suitably thermally insulated and it is thought unnecessary to show this.

The upper sides of the box are closed by lids 3 and 4, which are hinged to the box as at 6. The inner sides of the walls of the box have a metal lining 7 attached thereto.

Extending entirely across the box and joined at its edges to the four walls thereof, near but spaced inwardly from one open side of the box, is a partition 9 which is permanently fastened as at 8 to the metal lining 7 and between it and the lid 3, defines a compartment designated A adapted to contain meats or other foods, other than fish. The fish compartment B is in the form of a metal receptacle 10 of rectilinear outline the open side of which receptacle is closed by the lid 4. This receptacle 10 fits within the ice box and bears against the edges of partition members 11, which are attached to the stationary partition 9 and provide a plurality of small ice compartments C. The receptacle 10, partition 9 and two lids define the chambers A, B and C, with the ice chamber between the food and fish chambers.

Each lid has a rectilinear metal drip pan 12 fastened on its inner side and the side walls 13 of the drip pan are in angular form and extend into the open sides of the box. The walls 13 on the pan for the lid 4, are slightly spaced from the walls of the receptacle 10 and surround said receptacle. Likewise, the walls of the receptacle 10 are spaced from the metal lining 7 so that water from the ice chamber will pass through these spaces and into the pan 12. When the box is in the position shown in Fig. 2, moisture and drippings from the compartment C, will drain into the pan on the lid 4.

The walls of the box at the open ends are bevelled as at 14, and the angular portions 13 of the walls of the pans are disposed in spaced parallel relation to the bevelled and adjacent wall portions of the lining 7. The edges of the lining are bent to provide deflecting strips 15, which cause water draining between the pans and the lining to be directed into channels 16 formed in the inner sides of the lids 3 and 4. These channels 16 surround the pans 12 and provide for accumulating the water and moisture which may drain downwardly on the outer sides of the walls of the pans. Each lid is provided with drain openings 17 and 18. The opening 17 of each lid communicates with a drain opening 19 in each pan. Water draining through the openings 17 and 18 may be collected in any suitable receptacle, not shown.

By the construction of the pans and lids, all of the water and moisture draining downwardly will be collected in the pans and troughs and will run out through the openings 17 and 18. This prevents the unpleasant and "sloppy" conditions in and around the ice box. The lids are held in place by suitable catches 19 engaging projections 20 on the lids and operated by suitable mechanism 21.

With the box in position shown in Fig. 1, the lid 4 open, and the receptacle 10 removed, access is had to the ice compartments C, in order that they may be filled with ice. After filling the compartments with ice, fish are placed in the receptacle 10 and the receptacle is mounted in place so as to rest on the partitions 11. The lid is then closed and locked with the fasteners 19. When the lid is closed, the open part of the receptacle 10 extends into the pan 12 on said lid and is closed by engagement of the bottom of the pan with the receptacle. Due to the proximity of the receptacle to the ice, the fish is maintained in a fresh condition and the sealing of the receptacle prevents fish odors from escaping and permeating the box. On now reversing the box to bring the lid 3 uppermost as shown in Fig. 2, on opening the lid, access is had to the food compartments A and meat or other foods, other than fish, may be placed in said compartments after which the compartment is closed.

Water from the ice is prevented from dripping onto the foods or fish. The water from the ice compartment running over the walls of the fish receptacle B will assist in keeping the interior of the receptacle cool. The trough 16 in the lid prevents the water and moisture from leaking out between the box and the lids and causes all of the water and moisture draining downwardly to discharge through the openings 17 and 18.

I claim:

1. An ice box comprising a receptacle open on opposite sides, a support on which said receptacle is reversibly mounted in order to bring either side uppermost, lids for the open sides of the receptacle, means for locking the lids in closed position, a partition extending across the receptacle and defining between it and one of the lids a food storage compartment, a receptacle for fish removably mounted within the box with its open side arranged to be closed by the other lid and means for spacing the receptacle from said partition and defining an ice compartment between the receptacle and said partition.

2. An ice box comprising a receptacle open on opposite sides, a support on which said receptacle is reversibly mounted in order to bring either side uppermost, lids for the open sides of the receptacle, means for locking the lids in closed position, a partition extending across the receptacle and defining between it and one of the lids a food storage compartment, a receptacle for fish removably mounted within the box with its open side arranged to be closed by the other lid, means for spacing the receptacle from said partition and defining an ice compartment between the receptacle and said partition and drain pans mounted on the inner sides of the lids, said lids having drain openings communicating with the interior of the pans through which water and moisture may drain out of the ice box.

3. An ice box comprising a receptacle open on opposite sides, a support on which said receptacle is reversibly mounted in order to bring either side uppermost, lids for the open sides of the receptacle, means for locking the lids in closed position, a partition extending across the receptacle and defining between it and one of the lids a food storage compartment, a receptacle for fish removably mounted within the box with its open side arranged to be closed by the other lid, means for spacing the receptacle from said partition and defining an ice compartment between the receptacle and said partition and drain pans mounted on the inner sides of the lids, said lids having drain openings communicating with the interior of the pans through which water and moisture may drain out of the ice box, the said lids having drainage troughs surrounding the pans and being provided with outlet openings for said troughs.

4. An ice box comprising a receptacle open on opposite sides, a support on which said receptacle is reversibly mounted in order to bring either side uppermost, lids for the open sides of the receptacle, means for locking the lids in closed position, a partition extending across the receptacle and defining between it and one of the lids a food storage compartment, a receptacle for fish removably mounted within the box with its open side arranged to be closed by the other lid, means for spacing the receptacle from said partition and defining an ice compartment between the receptacle and said partition, drain pans mounted on the inner sides of the lids, said lids having drain openings communicating with the interior of the pans through which water and moisture may drain out of the ice box, the said lids having drainage troughs surrounding the pans and being provided with outlet openings for said troughs and deflecting members on the box for directing the drainage into a trough.

LAUREN M. BOWLUS.